United States Patent [19]
Wattron et al.

[11] Patent Number: 6,101,796
[45] Date of Patent: Aug. 15, 2000

[54] MOWER INCLUDING A DEVICE PREVENTING THE VIBRATIONS FROM BEING TRANSMITTED BETWEEN THE CUTTING MECHANISM AND THE CARRYING STRUCTURE

[75] Inventors: Bernard Wattron, Haegen; Martin Walch, Dettwiller, both of France

[73] Assignee: Kuhn S.A., Saverne Cedex, France

[21] Appl. No.: 09/018,617

[22] Filed: Feb. 4, 1998

[30] Foreign Application Priority Data

Feb. 14, 1997 [FR] France .................................. 97 01923

[51] Int. Cl.$^7$ .................................................. A01D 34/66
[52] U.S. Cl. .................................. 56/13.6; 56/6; 56/15.8; 92/161
[58] Field of Search .......................... 56/6, 7, 10.4, 13.6, 56/328, 10.2, 249, 15.8; 172/311, 269, 40, 403; 74/655, 730.1; 248/635, 638, 674; 92/161, 146

[56] References Cited

U.S. PATENT DOCUMENTS

| | | |
|---|---|---|
| 3,951,223 | 4/1976 | Kamlukin .................................. 180/11 |
| 4,584,928 | 4/1986 | Haynes ...................................... 92/161 |
| 4,610,128 | 9/1986 | Ermacora . |
| 4,669,256 | 6/1987 | Ermacora et al. . |
| 4,694,640 | 9/1987 | Ermacora et al. . |
| 4,714,123 | 12/1987 | Ermacora et al. . |
| 4,719,742 | 1/1988 | Ermacora et al. . |
| 4,720,964 | 1/1988 | Ermacora et al. . |
| 4,723,396 | 2/1988 | Ermacora . |
| 4,763,463 | 8/1988 | Ermacora et al. . |
| 4,771,591 | 9/1988 | Ermacora . |
| 4,811,553 | 3/1989 | Ermacora et al. . |
| 4,833,868 | 5/1989 | Ermacora et al. . |
| 4,848,069 | 7/1989 | Ermacora et al. . |
| 4,854,112 | 8/1989 | Holley et al. ................................. 56/6 |
| 4,947,629 | 8/1990 | Ermacora et al. . |
| 4,986,064 | 1/1991 | Ermacora . |
| 4,991,383 | 2/1991 | Ermacora . |
| 5,060,462 | 10/1991 | Helfer et al. . |
| 5,094,063 | 3/1992 | Wattron et al. . |
| 5,107,663 | 4/1992 | Wattron et al. . |
| 5,136,828 | 8/1992 | Ermacora . |
| 5,199,249 | 4/1993 | Wattron et al. . |
| 5,199,250 | 4/1993 | Ermacora et al. . |
| 5,295,414 | 3/1994 | Nakamura et al. ........................ 74/655 |
| 5,355,664 | 10/1994 | Zenner ...................................... 56/15.8 |
| 5,357,737 | 10/1994 | Ermacora et al. . |
| 5,367,864 | 11/1994 | Ogasawara et al. ...................... 56/15.8 |
| 5,417,042 | 5/1995 | Walch et al. . |
| 5,423,165 | 6/1995 | Walch et al. . |
| 5,481,857 | 1/1996 | Umemoto et al. . |
| 5,507,136 | 4/1996 | Walch . |
| 5,522,208 | 6/1996 | Wattron . |
| 5,660,032 | 8/1997 | Neuerburg et al. . |

FOREIGN PATENT DOCUMENTS

| | | |
|---|---|---|
| 0 068 560 A2 | 1/1983 | European Pat. Off. . |
| 0 118 952 A1 | 9/1984 | European Pat. Off. . |
| 0 245 186 A1 | 11/1987 | European Pat. Off. . |
| 0 267 659 A2 | 5/1988 | European Pat. Off. . |
| 0 297 012 A2 | 12/1988 | European Pat. Off. . |
| 0 338 649 A1 | 10/1989 | European Pat. Off. . |
| 0 642 731 A1 | 3/1995 | European Pat. Off. . |
| 0 666 017 A1 | 8/1995 | European Pat. Off. . |
| 2 255 839 | 7/1975 | France . |
| 31 45 337 A1 | 5/1983 | Germany . |

*Primary Examiner*—Robert Pezzuto
*Attorney, Agent, or Firm*—Oblon, Spivak, McClelland, Maier & Neustadt, P.C.

[57] ABSTRACT

A mower which includes a cutting mechanism connected to a carrying structure by connections wherein each connection includes a device preventing at least some of the vibrations from being transmitted between the cutting mechanism and the carrying structure. The cutting mechanism includes a gear box at which are arranged cutting members each rotating about a respective axis of rotation which is at least approximately vertical during work and the carrying structure to which the cutting mechanism is connected includes at least one connection which has a flexible element.

15 Claims, 3 Drawing Sheets

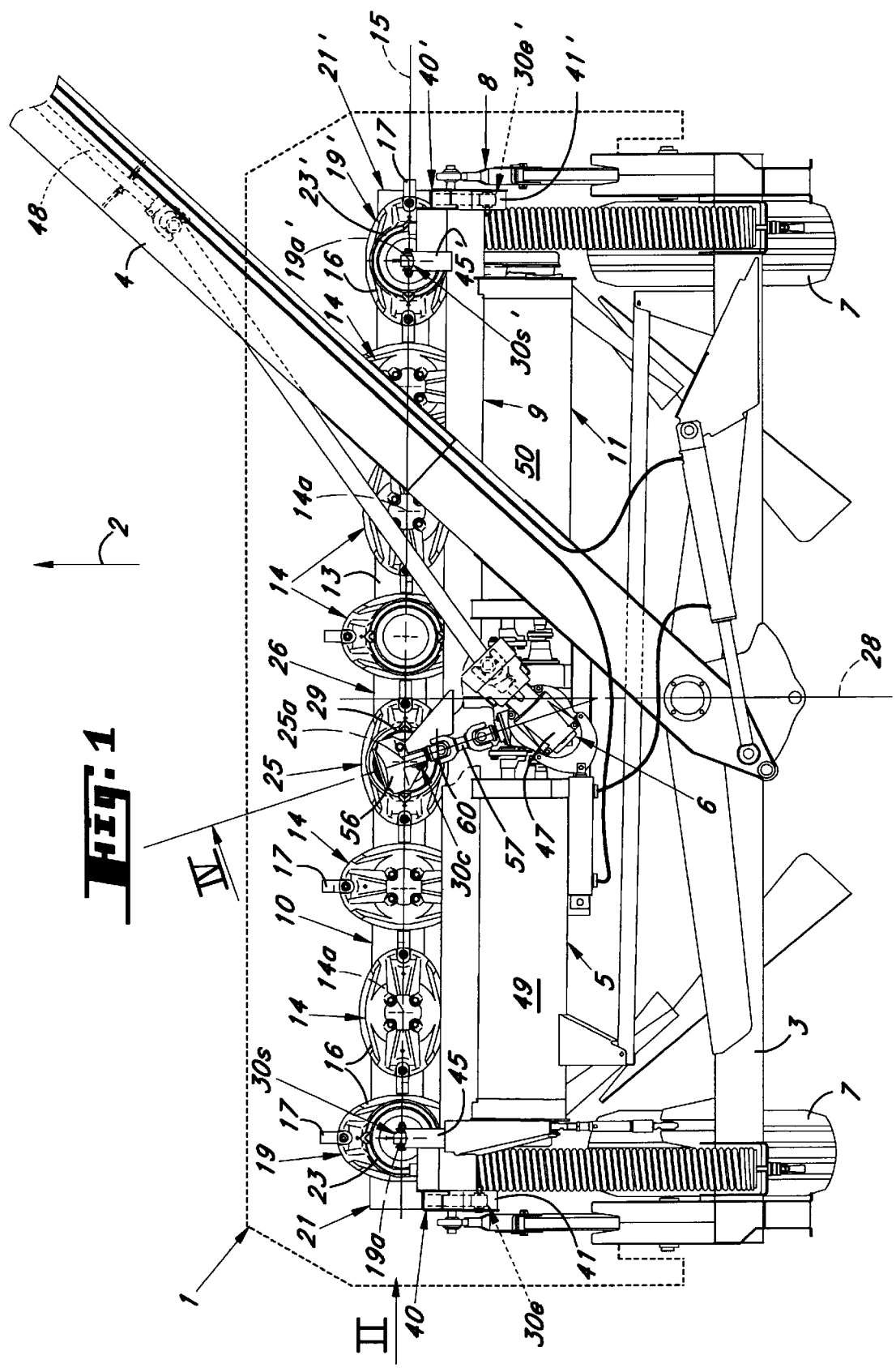

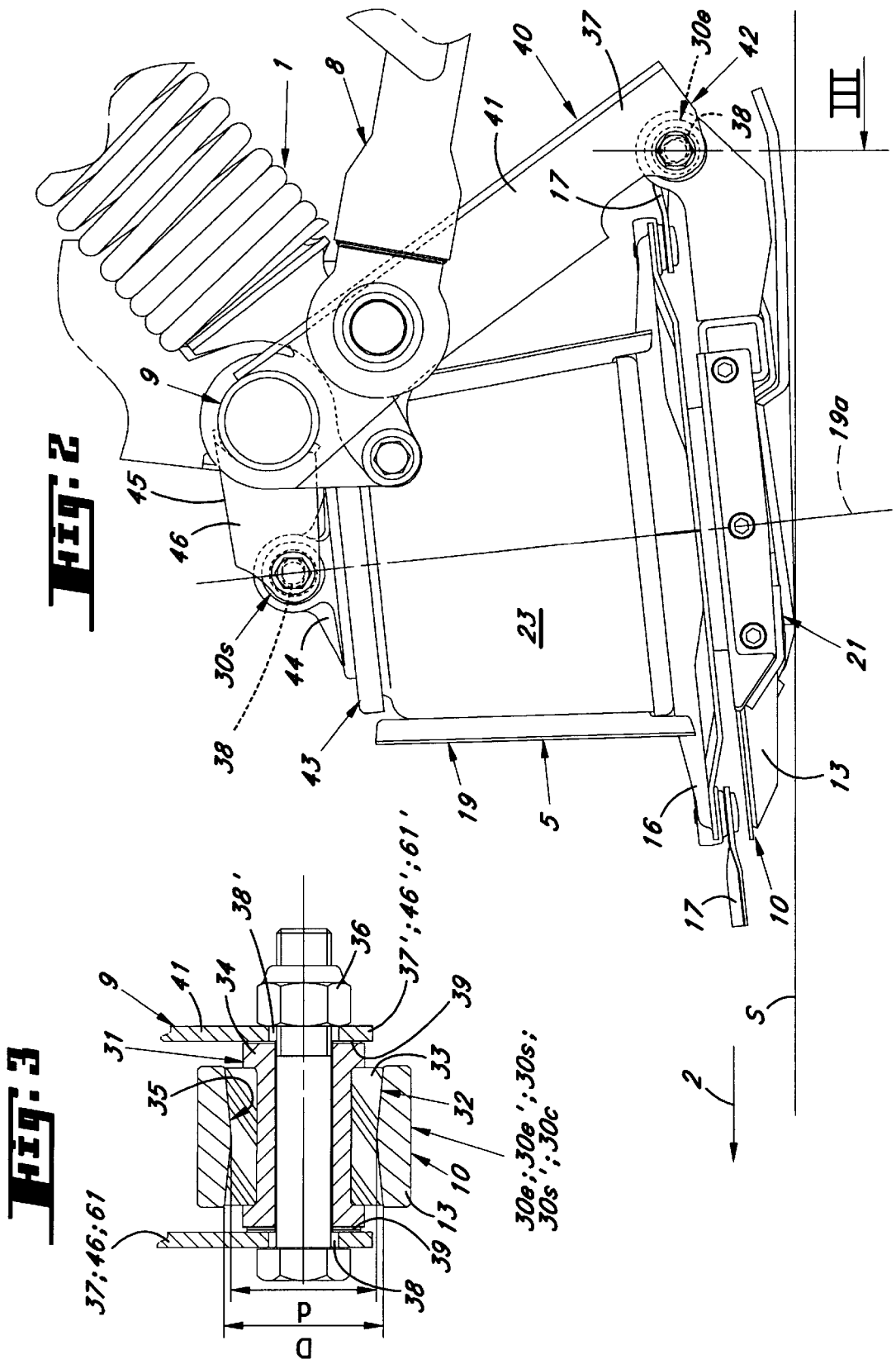

MOWER INCLUDING A DEVICE PREVENTING THE VIBRATIONS FROM BEING TRANSMITTED BETWEEN THE CUTTING MECHANISM AND THE CARRYING STRUCTURE

BACKGROUND OF THE INVENTION

1. Field of the Invention

The present invention relates to a mower comprising:

a cutting mechanism comprising a gearbox at which there are arranged cutting members each rotating about a respective axis of rotation which is at least approximately vertical during work, and;

a carrying structure to which the said cutting mechanism is connected by means of connections, at least one of which has a flexible element.

2. Discussion of the Background

A mower of this kind is known from European patent 0,338,649. This known mower comprises a carrying structure to which is connected a cutting mechanism which, in the normal working position, extends substantially horizontally and transversely to the direction of forward travel.

The cutting mechanism is connected at one of its ends to the carrying structure by means of a pivot connection of substantially horizontal longitudinal axis pointing in the direction of forward travel. At the other of its ends, the cutting mechanism is connected to the carrying structure by means of a connection comprising an elastic plate which extends substantially vertically and parallel to the pivot connection so as to allow a relative movement of the said cutting mechanism with respect to the carrying structure in order to avoid subjecting it to excessively high mechanical stresses especially during work and during the assembly of the mower.

However, this known mower has a certain number of drawbacks.

A first drawback lies in the fact that vibrations emanating from the cutting mechanism and from the carrying structure are prejudicial to the correct operation of the mower. This is because vibrations of the carrying structure are transmitted in part to the cutting mechanism, passing through the pivot connection and the elastic plate, which considerably shortens the life of the said cutting mechanism.

Conversely, vibrations and shocks to which the cutting mechanism is subjected are transferred to the carrying structure, thus causing damage to the latter.

SUMMARY OF THE INVENTION

The object of the present invention is to overcome the drawbacks of the mower of the prior art.

For this purpose, the mower according to the invention is characterized in that each connection connecting the cutting mechanism to the carrying structure includes a device preventing all or some of the vibrations from being transmitted between the said cutting mechanism and the said carrying structure.

The vibrations of the cutting mechanism and the vibrations of the carrying structure with which a mower of this kind is equipped are thus isolated and attenuated, and this allows the life of the various elements of the mower, especially of the bearings, the pinions, the welds etc. with which the latter is equipped, to be extended.

The invention also relates to the following features taken in isolation or in any technically possible combination thereof:

the device prevents all or some of the vibrations from being transmitted between the cutting mechanism and the carrying structure irrespective of the orientation of the said vibrations;

the device preventing all or some of the vibrations from being transmitted between the cutting mechanism and the carrying structure includes an elastic ring filtering out all or some of the said vibrations;

each lateral end of the gearbox of the cutting mechanism is connected directly or indirectly to the carrying structure by means of an end connection including an elastic ring filtering out all or some of the vibrations between the cutting mechanism and the carrying structure;

each end connection connecting the gearbox to the carrying structure is situated close to the ground;

each end connection connecting the gearbox to the carrying structure is situated behind the cutting members when considering the direction of the forward travel;

the cutting mechanism includes two end cutting members, at least one of which is connected to the carrying structure by means of an upper connection including an elastic ring filtering out all or some of the vibrations between the said cutting mechanism and the said carrying structure;

the (each) upper connection connecting an end cutting member to the carrying structure is situated above the said corresponding end cutting member so as to prevent the cutting mechanism from pivoting about the end connections;

the middle part of the cutting mechanism is connected to the carrying structure by means of a central connection including an elastic ring filtering out all or some of the vibrations between the cutting mechanism and the said carrying structure, the said central connection advantageously allowing the said cutting mechanism to be stiffened so as to avoid subjecting it to excessively high mechanical, especially bending, stresses during work;

the central connection is situated above a middle cutting member which lies at least approximately midway between the end cutting members;

the middle cutting member is driven in motion by means of transmission members including a transmission gearbox, arranged, on the one hand, above the said middle cutting member and connected, on the other hand, to the carrying structure by means of the central connection;

the transmission members include a transmission box connected to the carrying structure and driving the transmission gearbox in motion by means of an intermediate transmission shaft preventing all or some of the vibrations from being transmitted between the said transmission gearbox and the said transmission box;

the intermediate transmission shaft which is used to transmit the motion of the transmission box to the transmission gearbox allows a relative movement of the cutting mechanism with respect to the carrying structure;

an elastic coupling is provided preventing all or some of the vibrations from being transmitted between the transmission box and the transmission gearbox;

each elastic ring belonging to a connection connecting the cutting mechanism to the carrying structure includes a rubber element isolating the said cutting mechanism from the said carrying structure.

BRIEF DESCRIPTION OF THE DRAWINGS

Other objects, features and advantages of the invention will become clear from the following description with reference to the appended drawings which depict, by way of non-limiting example, one embodiment of the mower according to the invention.

In these drawings:

FIG. 1 depicts a view from above of a mower, which has been part-sectioned in a number of places;

FIG. 2 is a side view in the direction of arrow II defined in FIG. 1;

FIG. 3 is a section on plane III defined in FIG. 2;

DESCRIPTION OF THE PREFERRED EMBODIMENT

Figure 4:
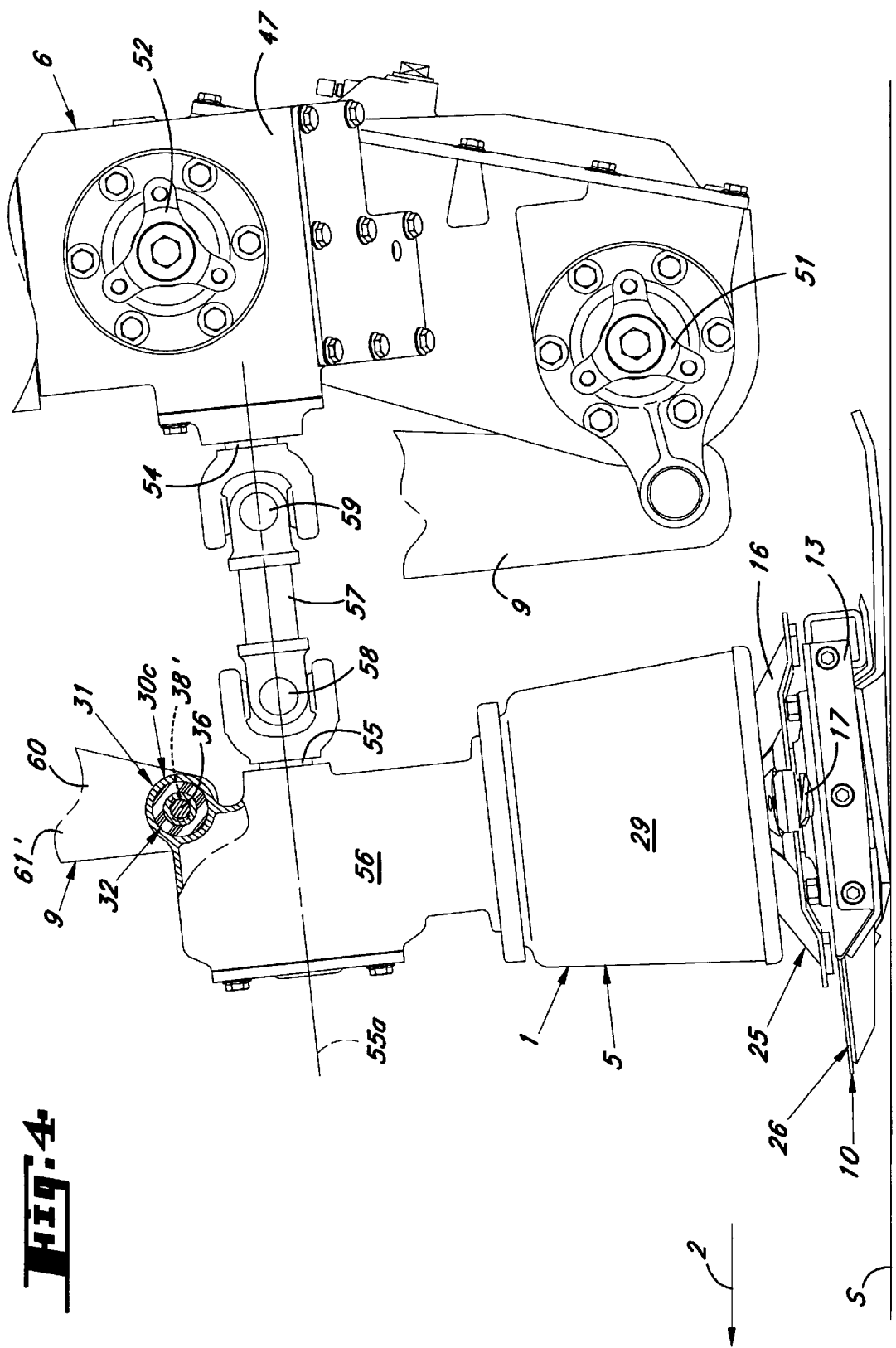
FIG. 4 is a part section on plane IV defined in FIG. 1.

The various figures show a mower 1 according to the invention, produced according to the example depicted, in the form of a mower-conditioner. The latter is intended to be hitched to a tractor vehicle (not depicted) which, during use, tows it in the direction of forward travel 2.

In the remainder of the description, the following concepts: "front", "rear", "in front of" and "behind" are defined with respect to this direction of forward travel 2 and the concepts of "right" and "left" are defined when looking at the mower 1 from behind in the direction of forward travel 2.

This mower 1 broadly speaking comprises a moving chassis 3, a drawbar 4, a harvesting mechanism 5 and transmission members 6.

This mower 1, according to the example depicted, is intended to work to the right and to the left behind the tractor vehicle (not depicted). For this purpose, the drawbar 4 is intended to be connected at one of its ends to the said tractor vehicle and to the middle part of the moving chassis 3 in a way known to those skilled in the art. The moving chassis 3 at each of its lateral ends has a wheel 7 by means of which wheels it rests on the ground S and which wheels also allow the mower 1 to be towed behind the tractor vehicle.

The harvesting mechanism 5 is connected to the moving chassis 3 by means of a suspension device 8 known to those skilled in the art. This harvesting mechanism 5 comprises, according to the example depicted, a carrying structure 9, a cutting mechanism 10 and a conditioning device 11.

The cutting mechanism 10 extends, in the normal working position, substantially horizontally and orthogonally to the direction of forward travel 2. It comprises a closed gearbox 13 of longitudinal shape, at which there are arranged cutting members 14, 19, 19', 25 each intended to rotate about a respective at least approximately vertical axis of rotation 14a, 19a, 19a', 25a.

The axes of rotation 14a, 19a, 19a', 25a are arranged in a line 15 running substantially orthogonally in the direction of forward travel 2. It will be seen that each cutting member 14, 19, 19', 25 includes a disc 16 at the ends of which there are cutting tools 17. Each end cutting member 19, 19' situated respectively at a lateral end 21, 21' of the gearbox 13 is also equipped with a windrowing cap 23, 23' fixed to the corresponding disc 16.

A middle cutting member 25 which extends at the level of the middle part 26 of the cutting mechanism 10, depicted schematically by a vertical mid-plane 28 lying midway between the end cutting members 19, 19', is also equipped with a windrowing cap 29 which is fixed on the disc 16 of the said middle cutting member 25.

The cutting mechanism 10 is connected to the carrying structure 9 by means of connections 30e, 30e', 30s, 30s' 30c each including a device 31 preventing all or some of the vibrations from being transmitted between the said cutting mechanism 10 and the said carrying structure 9 irrespective of the orientation of the said vibrations.

For this purpose, it can be seen from FIG. 3 that each device 31 preventing all or some of the vibrations from being transmitted includes an elastic ring 32.

This elastic ring 32 includes a flexible element composed of a rubber element 33 through which a flanged ring 34 extends.

According to the embodiment depicted, the rubber element 33 extends inside a bore 35 made in the cutting mechanism 10.

It will be noted that the central diameter d at the middle of the bore 35 is smaller than the lateral diameters D at the ends of the said bore 35. In other words, the bore 35 is of convex shape so as to encourage better axial retention of the rubber element 33 in the said bore 35.

It will also be noted that, when the elastic ring 32 is not fitted and extends out of the bore 35, the rubber element 33 is diametrically larger than the lateral diameters D of the said bore 35.

The flanged ring 34 is fixed to the carrying structure 9 by means of a bolt 36 extending on the one hand through the said flanged ring 34 and passing, on the other hand, through two wings 37, 37'; 46, 46'; 61, 61' belonging to the carrying structure 9.

In FIG. 3, it will be seen that the two wings 37, 37'; 46, 46'; 61, 61' are situated one on either side of the said flanged ring 34 and that each wing 37, 37'; 46, 46'; 61, 61' has an oblong hole 38, 38' through which the said bolt 36 extends.

The cutting mechanism 10 is held transversely in place on the carrying structure 9 by means of shims 39 situated between the wings 37, 37'; 46, 46'; 61, 61' and the flanged ring 34.

These oblong holes 38, 38' and these shims 39 advantageously allow the carrying structure 9 to be mounted on the cutting mechanism 10 without any initial stresses being introduced into the construction, even if the said cutting mechanism 10 and/or the said carrying structure 9 are somewhat deformed or if their dimensions are at the outer limits of the manufacturing tolerances.

Such connections 30e, 30e', 30s, 30s', 30c connecting the cutting mechanism 10 to the carrying structure 9 by means of rubber elements 33 allow the said cutting mechanism 10 to be isolated from the said carrying structure 9, and this advantageously allows all or some of the vibrations from the said cutting mechanism 10 and/or from the said carrying structure 9 to be filtered out.

A design of this kind additionally allows shocks and jolts to which the cutting mechanism 10 is subjected during work to be damped.

According to the embodiment depicted, each lateral end 21, 21' of the gearbox 13 of the cutting mechanism 10 is connected to the carrying structure 9 by means of an end connection 30e, 30e' described earlier. Each of these end connections 30e, 30e' is situated behind the corresponding end cutting member 19, 19' and outside of the surface swept by the cutting tools 17 of the said end cutting member 19, 19'.

From FIG. 2 it will also be seen that each connection 30e, 30e' is situated close to the ground S. For this purpose, the carrying structure 9 has at each of its lateral ends 40, 40' an arm 41, 41' which extends backwards and downwards as far as the level of the said corresponding connection 30e, 30e'.

The lower end 42 of each arm 41, 41' has two wings 37, 37' allowing the flanged ring 34 of the elastic ring 32 to be attached to the said carrying structure 9 as described earlier.

From FIGS. 1 and 2 it can also be seen that each end cutting member 19, 19' situated respectively at a lateral end 21, 21' of the gearbox 13 is also connected to the carrying structure 9 by means of an upper connection 30s, 30s' described earlier. Each upper connection 30s, 30s' is situated above the corresponding end cutting member 19, 19'. For this purpose, the upper part 43 of each windrowing cap 23, 23' of the corresponding end cutting member 19, 19' has a connecting element 44 connected to the said windrowing cap 23, 23' by means of a cylindrical articulation (not depicted) the longitudinal axis of which is concurrent with the corresponding axis of rotation 19a, 19a'.

At each of its lateral ends 40, 40' the carrying structure 9 has another substantially horizontal arm 45, 45' extending forwards as far as the corresponding connection 30s, 30s'. These connections 30s, 30s' are similar to the connections 30e, 30e' described earlier and will therefore not be described further in detail.

It will, however, be noted that each arm 45, 45' has two wings 46, 46' comparable with the wings 37, 37' of the corresponding arm 41, 41' which were described earlier.

The cutting members 14, 19, 19', 25 are intended to be driven in rotation by means of the transmission members 6 of the mower 1.

For this purpose, the transmission members 6 include a transmission box 47 which is connected to the carrying structure 9 and which receives the motion from the tractor vehicle (not depicted), by means of a line of shafts 48.

According to the embodiment depicted, the conditioning device 11 is composed of two conditioning units 49, 50 between which the transmission box 47 extends.

Each conditioning unit 49, 50 has two conditioning members (not depicted) known to those skilled in the art. For this purpose, FIG. 4 shows that the transmission box 47 has, at each of its sides, a first output shaft 51 and a second output shaft 52 each one driving one conditioning member in a way known to those skilled in the art. The transmission box 47 additionally includes a third output shaft 54 driving an input shaft 55 of a transmission gearbox 56 by means of an intermediate transmission shaft 57 extending at least substantially horizontally forwards. The transmission gearbox 56 is arranged above the windrowing cap 29 of the middle cutting member 25 and has an output shaft (not depicted) extending at least substantially vertically downwards and driving the various cutting members 14, 19, 19', 25 of the cutting mechanism 10 via the disc 16 of the said middle cutting member 25.

The intermediate transmission shaft 57 on the one hand prevents all or some of the vibrations from being transmitted between the said transmission gearbox 56 and the said transmission box 47 and on the other hand allows relative movement of the cutting mechanism 10 with respect to the carrying structure 9. For this purpose, the intermediate transmission shaft 57 includes, according to the example depicted, two universal joints 58, 59 and the input shaft 55 of the transmission gearbox 56 can move to some extent along its longitudinal axis 55A.

The transmission gearbox 56 is connected to the carrying structure 9 by means of a central connection 30c described earlier. This central connection 30c is situated above the middle cutting member 25 and at least substantially midway between the end cutting members 19, 19'.

For this purpose, the carrying structure 9 includes a central arm 60 extending substantially vertically downwards and being situated at least substantially in the vertical mid-plane 28.

This connection 30c is similar to the connections 30e, 30e' described earlier and will therefore not be described further in detail. It will, however, be noted that the central arm 60 has two wings 61, 61' comparable with the wings 37, 37' of the corresponding arm 41, 41' which were described earlier.

Finally, various modifications are still possible especially as regards construction of the various elements or by substituting technical equivalents, without in any way departing from the field of protection defined in the claims.

In particular, it is perfectly possible for the intermediate transmission shaft 57 to be equipped with an elastic coupling including an elastic element and furthermore preventing all or some of the torsional vibrations from being transmitted between the transmission gearbox 56 and the said transmission box 47.

In addition, it is also possible for each device 31 preventing all or some of the vibrations from being transmitted between the cutting mechanism 10 and the carrying structure 9 to be equipped with an elastic ring which can also withstand significant axial loads. For this, the rubber element of an elastic ring may also bear laterally against the cutting mechanism 10.

We claim:

1. Mower comprising:
    a cutting mechanism comprising a gearbox said gearbox supporting cutting members each rotating about a respective axis of rotation which is at least approximately vertical during work, said gearbox being located under the cutting members and;
    a carrying structure to which the said cutting mechanism is rigidly connected by a plurality of connections, at least one of which has a flexible element;
    wherein each connection connecting said cutting mechanism to said carrying structure includes a vibration prevention device preventing vibrations from being transmitted between said cutting mechanism and said carrying structure.

2. Mower according to claim 1, wherein the cutting mechanism is isolated from the carrying structure by said vibration prevention device so that at least some of the vibrations from the said cutting mechanism and from the said carrying structure are filtered out, and so that shocks and jolts to which the cutting mechanism is subjected during work are damped irrespective of the orientation of the vibrations.

3. Mower according to claim 1, wherein the vibration preventing device includes an elastic ring.

4. Mower according to claim 1, wherein each lateral end of the gearbox of the cutting mechanism is connected directly to the carrying structure by an end connection including an elastic ring.

5. Mower according to claim 4, wherein each end connection connecting the gearbox to the carrying structure is situated in proximity with the ground.

6. Mower according to claim 4, wherein each end connection connecting the gearbox to the carrying structure is situated behind the cutting members with respect to the direction of the forward travel.

7. Mower according to claim 1, wherein the cutting mechanism includes two end cutting members, at least one of which is connected to the carrying structure by an upper connection including an elastic ring.

8. Mower according to claim 7, wherein the upper connection connecting an end cutting member to the carrying structure is situated above a corresponding end cutting member.

9. Mower according to claim 1, wherein the middle part of the cutting mechanism is connected to the carrying structure by a central connection including an elastic ring.

10. Mower according to claim 9, wherein the central connection is situated above a middle cutting member which extends at least approximately midway between two end cutting members of the cutting mechanism.

11. Mower according to claim 10, wherein the middle cutting member is driven in motion by means of transmission members including a transmission gearbox arranged above the said middle cutting member and connected to the carrying structure by means of the central connection.

12. Mower according to claim 11, wherein the transmission members include a transmission box connected to the carrying structure and driving the transmission gearbox in motion by an intermediate transmission shaft at least some of the vibrations from being transmitted between said transmission gearbox and the said transmission box.

13. Mower according to claim 12, wherein the intermediate transmission shaft which is used to transmit the motion of the transmission box to the transmission gearbox allows relative movement of the cutting mechanism with respect to the carrying structure.

14. Mower according to claim 13, wherein an elastic coupling is provided preventing at least some of the vibrations from being transmitted between the transmission box and the transmission gearbox.

15. Mower according to claim 3, wherein each elastic ring belonging to a connection connecting the cutting mechanism to the carrying structure includes a rubber element isolating said cutting mechanism from the said carrying structure.

* * * * *